United States Patent [19]

Nagase et al.

[11] 4,442,813
[45] Apr. 17, 1984

[54] METHOD OF AND APPARATUS FOR CONTROLLING THE IGNITION TIMING OF AN INTERNAL COMBUSTION ENGINE

[75] Inventors: Masaomi Nagase, Toyota; Hideo Miyagi, Okazaki; Hironobu Ono, Toyota; Jiro Nakano, Okazaki, all of Japan

[73] Assignee: Toyota Jidosha Kogyo Kabushiki Kaisha, Toyota, Japan

[21] Appl. No.: 304,562

[22] Filed: Sep. 22, 1981

[30] Foreign Application Priority Data

Sep. 25, 1980 [JP] Japan .................. 55-132270

[51] Int. Cl.³ .................................... F02P 5/04
[52] U.S. Cl. .................. 123/418; 123/421; 123/424
[58] Field of Search .......... 123/424, 416, 417, 418, 123/421

[56] References Cited

U.S. PATENT DOCUMENTS

| 3,543,738 | 12/1970 | Barber et al. ................ 123/418 |
| 3,901,201 | 8/1975 | Mizuguchi et al. ............ 123/424 |
| 4,022,170 | 5/1977 | Crall et al. ................... 123/415 |
| 4,077,372 | 3/1978 | Masta ......................... 123/416 |
| 4,104,998 | 8/1978 | Fenn .......................... 123/424 |
| 4,112,891 | 9/1978 | Spaulding ................. 123/146.5 A |
| 4,131,098 | 12/1978 | Daniels et al. ............. 123/424 |
| 4,178,893 | 12/1979 | Aoki ......................... 123/424 |
| 4,232,642 | 11/1980 | Yamaguchi et al. ......... 123/416 |
| 4,262,644 | 4/1981 | Walker et al. ............. 123/418 |
| 4,276,602 | 6/1981 | Obara et al. ............... 123/417 |
| 4,359,988 | 11/1982 | Matsubara .................. 123/424 |
| 4,380,983 | 4/1983 | Kobashi et al. ............. 123/424 |

*Primary Examiner*—Andrew M. Dolinar
*Attorney, Agent, or Firm*—Cushman, Darby & Cushman

[57] ABSTRACT

The ignition timing of an internal combustion engine is controlled to a fixed value during starting or for a period just after starting. However, if the engine is in a high-speed operating condition, the above control for fixing the ignition timing is interrupted and the ignition timing is controlled to change depending upon the change of the operating conditions of the engine.

12 Claims, 13 Drawing Figures

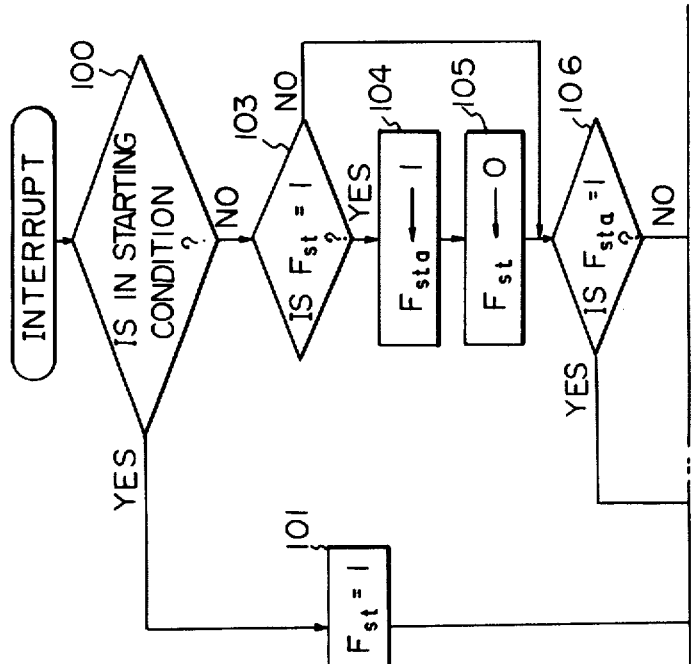

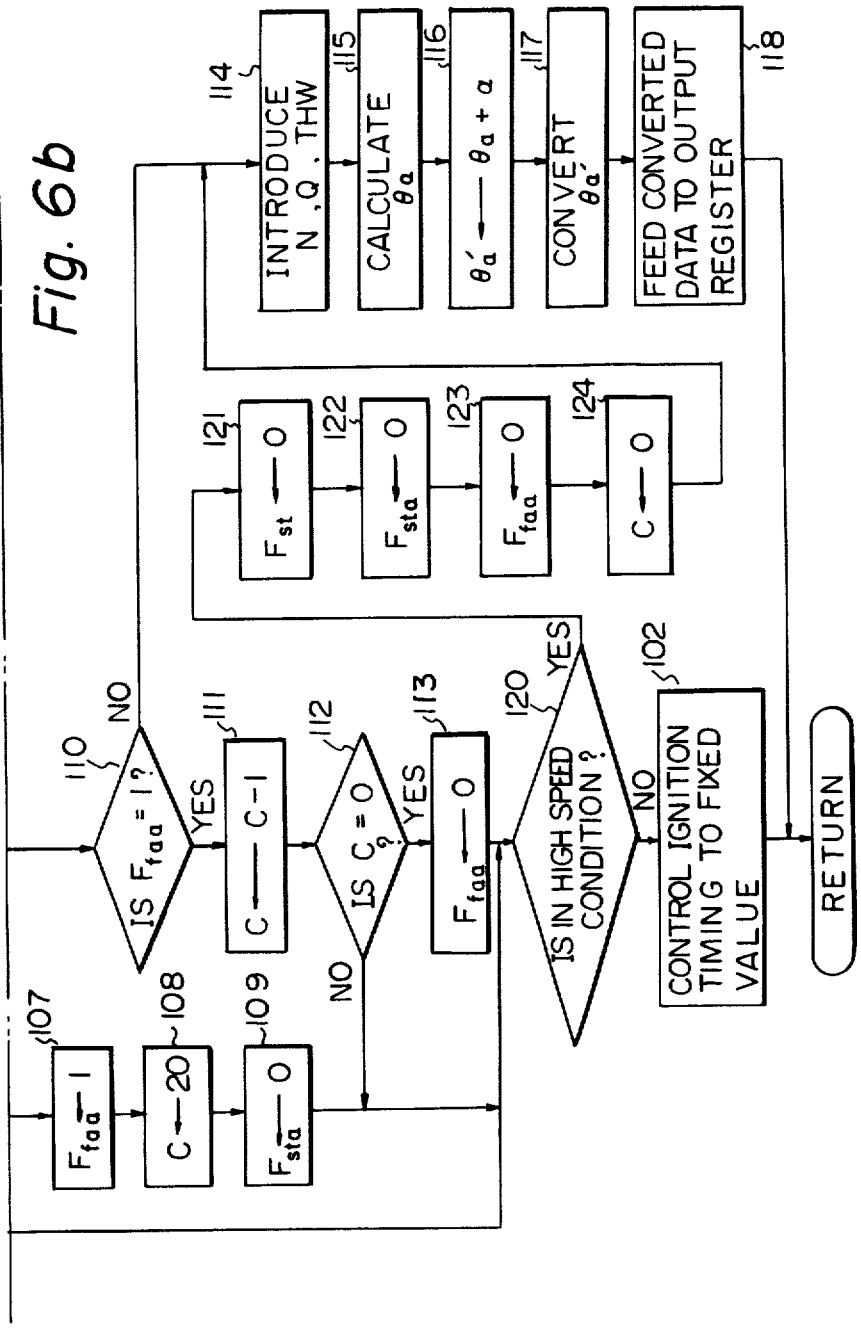

METHOD OF AND APPARATUS FOR CONTROLLING THE IGNITION TIMING OF AN INTERNAL COMBUSTION ENGINE

BACKGROUND OF THE INVENTION

The present invention relates to a method of controlling the ignition timing of an internal combustion engine.

A well-known ignition timing control system of an internal combustion engine controls the ignition timing by detecting engine parameters that represent the operating conditions of an internal combustion engine, e.g., detecting the rotational speed of the engine, flow rate of the intake air, pneumatic pressure in the intake manifold, to calculate the ignition timing, and instructing the ignition at a calculated timing. In the system of this type, under some conditions the ignition timing is often fixed to a predetermined constant value, since engine parameters such as rotational speed, undergo great variation when the engine is being started or until a predetermined period of time has passed after starting.

However, when the rotational speed of the engine is greatly raised while the ignition timing has been fixed to a predetermined value as mentioned above, the period for storing energy in the ignition coil becomes too short causing misfire to occur, or the period during which the flow of current to the ignition coil is interrupted becomes short so that the ignition coil overheats, and a power transistor for controlling the primary current to the ignition coil is often destroyed by the heat.

SUMMARY OF THE INVENTION

It is, therefore, an object of the present invention to provide a method of and apparatus for controlling the ignition timing of an internal combustion engine, whereby misfiring can be reliably prevented from occurring, the ignition coil can be prevented from overheating, and the power transistor for controlling the ignition signal can be prevented from being destroyed by heat, even when the rotational speed of the engine is rapidly increased by racing during starting or immediately after starting.

Another object of the present invention is to provide a method of and apparatus for controlling the ignition timing, whereby the period of controlling the ignition timing to a fixed value can be prolonged causing the starting performance to increase.

According to the present invention, an operating condition of the engine is detected to produce at least one first electrical signal which indicates the detected operating condition. In response to the produced first electrical signal, a spark advance angle is calculated which corresponds to an optimum ignition timing at the detected operating condition. Also, whether or not the engine is in a first specific state where it is difficult to perform the above calculation correctly or a second specific state where the rotational speed of the engine will be high and detected. A second electrical signal is produced when the engine is in the first state and a third electrical signal is produced when the engine is in the second state. The timing of the sparks applied to the engine is adjusted depending upon the calculated spark advance angle. In response to the second and third electrical signals, only when the engine is in the first specific state but not in the second specific state, the timing of the sparks applied to the engine is kept at a predetermined fixed timing.

The above and other related objects and features of the present invention will be apparent from the description of the present invention set forth below, with reference to the accompanying drawings, as well as from the appended claims.

BRIEF DESCRIPION OF THE DRAWINGS

FIGS. 6, 6a and 6b are a flow diagram illustrating a program for performing arithmetic operations with respect to the ignition control;

DETAILED DESCRIPTION OF THE PREFERRED EMBODIMENTS

Figure 1:
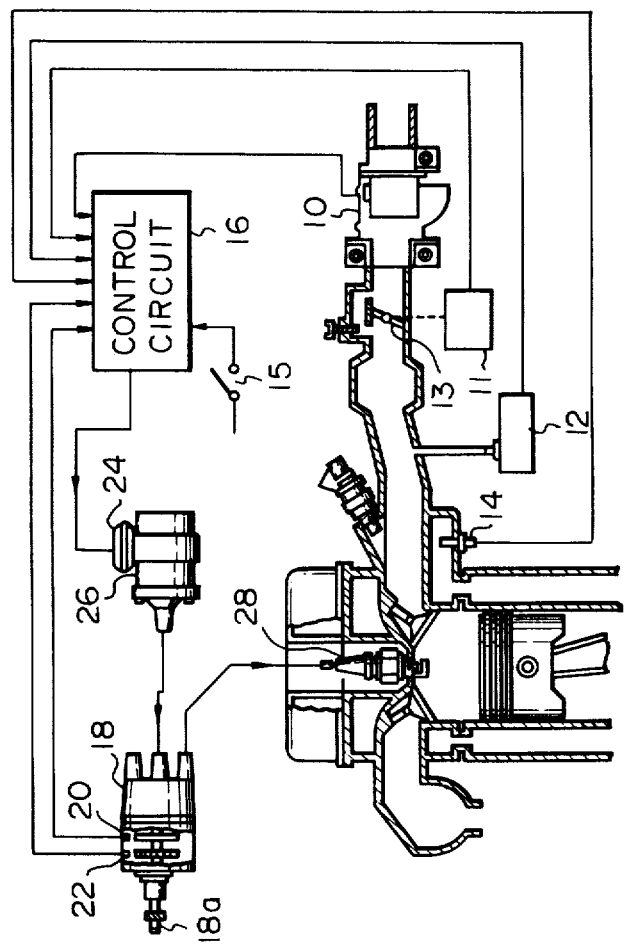
FIG. 1 is a schematic diagram illustrating a system to which the present invention is used.

Referring to FIG. 1, which schematically illustrates an ignition timing control system, with a microcomputer, of an internal combustion engine, reference numeral 10 denotes an air flow sensor which detects the flow rate of the air sucked into the engine to generate a voltage that corresponds to a detected value, 12 a pneumatic pressure sensor which detects the pneumatic pressure in an intake manifold of the engine to generate a voltage corresponding to a detected value, 14 a coolant temperature sensor which detects the temperature of the coolant to produce a voltage corresponding to a detected value, 15 a starter switch which will be closed when cranking, and 11 a throttle sensor which detects whether a throttle valve 13 is opened in excess of a predetermined opening degree or not, or whether the rate of opening the throttle valve 13 is faster than a predetermined value or not. A control circuit 16 is served with output voltages from the air flow sensor 10, the pneumatic pressure sensor 12 and the coolant temperature sensor 14, a signal from the starter switch 15 which indicates that the engine is cranking, i.e., which indicates that the engine is in the starting condition, and with a signal from the throttle sensor 11.

A distributor 18 of the engine is equipped with a first crank angle sensor 20 and a second crank angle sensor 22. The sensor 20 generates an angular position signal every time the distributor shaft 18a has rotated by a predetermined crank angle of 360°. The other sensor 22 generates an angular position signal at every crank angle of 60°. The two angular position signals from the crank angle sensors are fed to the control circuit 16.

The control circuit 16 feeds an ignition signal to an igniter 24. A power transistor in the igniter 24 permits and interrupts the flow of a primary current to an ignition coil 26. A secondary current of a high voltage produced by the ignition coil 26 is fed to one of the spark plugs 28 via the distributor 18.

Figure 2:
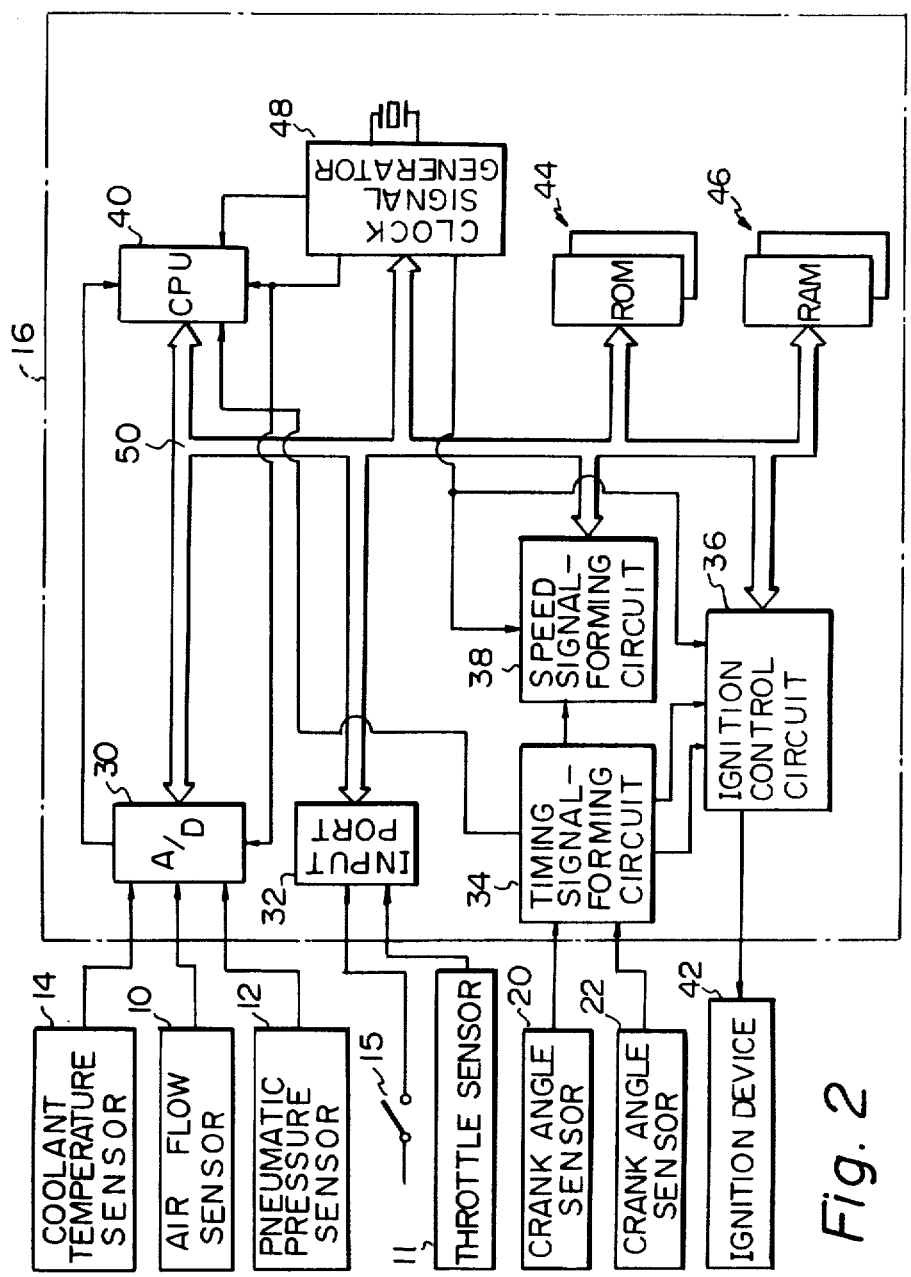
FIG. 2 is a block diagram illustating the control circuit in FIG. 1.

FIG. 2 is a block diagram illustrating an embodiment of the control circuit 16 of FIG. 1.

Output voltages of the coolant temperature sensor 14, air flow sensor 10 and pneumatic pressure sensor 12 are fed to an A/D converter 30 which includes an analog multiplexer, and are successively converted into signals in the form of binary numbers. Further, the signals from the starter switch 15 and the throttle sensor 11 are fed to an input port 32.

The angular position signals produced by the first and second crank angle sensors 20 and 22 at every crank angle of 360° and 60°, respectively, are fed to a timing signal-forming circuit 34, which forms various timing signals $S_{ld}$, $S_{bc}$ that will be fed to an ignition control circuit 36, an interrupt request signal $S_{irt}$ for calculating the ignition timing, and a gate control signal $S_g$ which will be fed to a speed signal-forming circuit 38.

The speed signal-forming circuit 38 has a gate that will be opened and closed by a gate control signal $S_g$ having a pulse width which corresponds to the crank angle of 60° fed from the timing signal-forming circuit 34, and a counter which counts the number of clock pulses that pass through the gate when the gate is opened each time. The speed signal-forming circuit 38 forms a binary speed signal having a value that corresponds to the rotational speed of the engine.

The ignition control circuit 36 forms an ignition signal in accordance with a first output data related to a timing for permitting the current to flow into the ignition coil 26 and a second output data related to a timing for stopping the current from flowing into the ignition coil 26, i.e., related to the ignition timing. The first and second output data are calculated by a central processing unit (CPU) 40. The formed ignition signal is fed to an ignition device 42 consisting of the spark plugs 28, the distributor 18, the ignition coil 26, and the like that are shown in FIG. 1.

The A/D converter 30, input port 32, speed signal-forming circuit 38, and ignition control circuit 36 are connected to the CPU 40, a read-only memory (ROM) 44, a random access memory (RAM) 46, and a clock generator circuit 48 via a bus 50. The input and output data are transferred via the bus 50.

Further, although not diagrammatized in FIG. 2, the microcomputer is equipped with an input/output control circuit, memory control circuit and the like in a customary manner.

In the ROM 44 have been stored beforehand a program for a main processing routine, an interrupt processing program for calculating the ignition timing, and other processing programs, as well as various data necessary for performing arithmetic calculation, as will be mentioned later.

In FIGS. 1 and 2, the engine is equipped with both the air flow sensor 10 and the pneumatic pressure sensor 12. The present invention, however, can be put into practice if either one of these sensors is provided.

Figure 3:
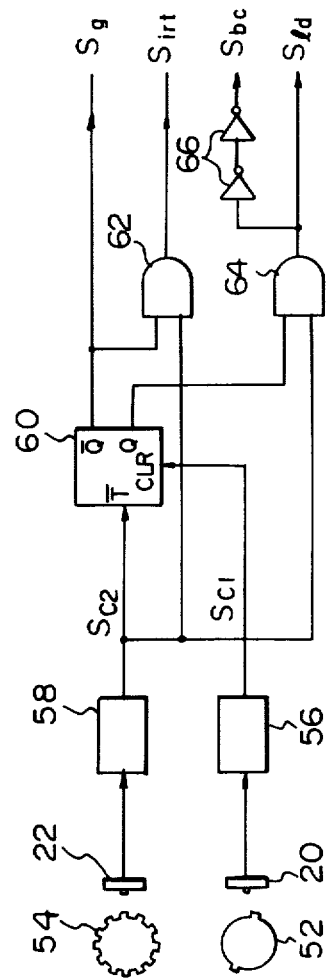
FIG. 3 is a block diagram illustrating the timing signal-forming circuit in FIG. 2.
Figure 4:
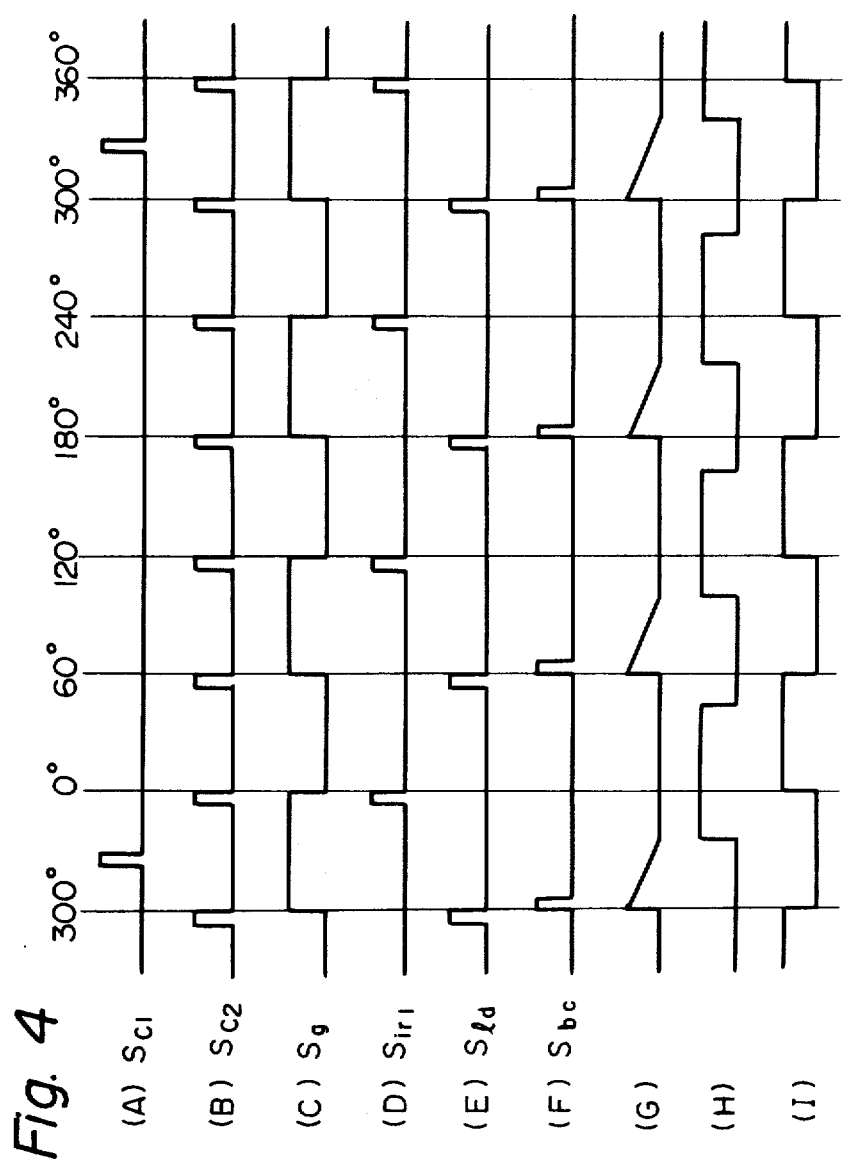
FIG. 4 illustrates nine wave forms of signals at each portions of the circuits in FIGS. 3, 5 and 10.

FIG. 3 illustrates one constitution of the timing signal-forming circuit 34 of FIG. 2, in which reference numerals 52 and 54 denote magnetic discs which are attached to the distributor shaft and turn a half revolution for every turn of the crank shaft of the engine. Projections of predetermined numbers are provided on the periphery of the discs 52, 54 maintaining equal distances. As the projections pass by the crank angle sensors 20 and 22 consisting of magnetic pick-up sensors, pulses are produced at every crank angle of 360° and 60°, respectively. The pulses from the sensors 20 and 22 are shaped by waveform shaping circuits 56 and 58, and are converted into crank angular position signals $S_{c1}$ and $S_{c2}$ as illustrated in the diagrams (A) and (B) of FIG. 4. FIG. 4 illustrates signal waveforms of each of the portions of the circuits of FIGS. 3, 5 and 10, in which the abscissa represents crank angles when the top dead center in the compression stroke of a given cylinder among many cylinders of the engine is set to be zero.

A trigger-type flip-flop 60 is reset by the above-mentioned crank angular position signal $S_{c1}$ to forcibly set its own outputs Q and $\overline{Q}$ to a low and high levels, respectively. When the crank angular position signal $S_{c2}$ is applied, the outputs Q and $\overline{Q}$ of the flip-flop 60 are inverted. Therefore, the output $\overline{Q}$ of the flip-flop 60 serves as a gate control signal $S_g$ as shown in the diagram (C) of FIG. 4. The output of an AND gate 62 which receives the gate control signal $S_g$ and the crank angular position signal $S_{c2}$, serves as an interrupt request signal $S_{irt}$. The negative edge of the interrupt request signal $S_{irt}$ appears at the crank angular positions of 0°, 120° and 240°, or in other words, appears at the top dead center in every compression stroke of each of the cylinders, as shown in the diagram (D) of FIG. 4. Further, the output of an AND gate 64 which receives the output Q of the flip-flop 60 and the crank angular position signal $S_{c2}$, serves as a load timing signal $S_{ld}$. The negative edge of the load timing signal $S_{ld}$ appears at the crank angular positions of 60°, 180° and 360°. A reference angular position signal $S_{bc}$ as shown in the diagram (F) of FIG. 4 is formed by slightly delaying the load timing signal $S_{ld}$ with respect to time in a delay circuit 66.

Figure 5:
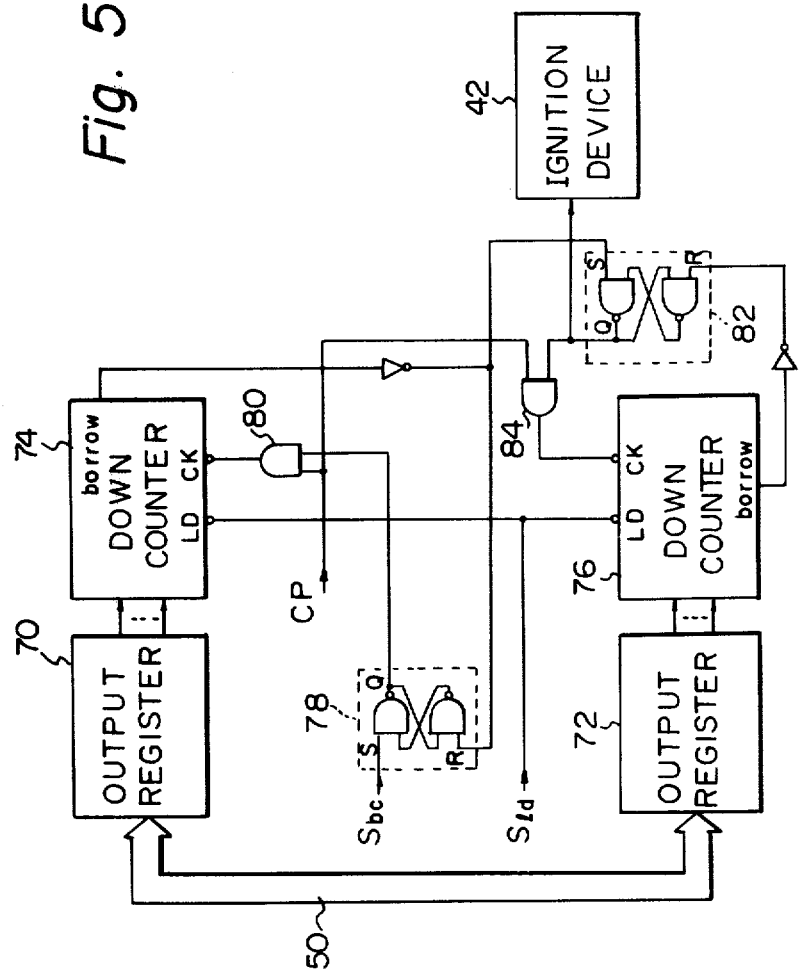
FIG. 5 is a block diagram illustrating one example of the ignition control circuit in FIG. 2.
Figure 7:
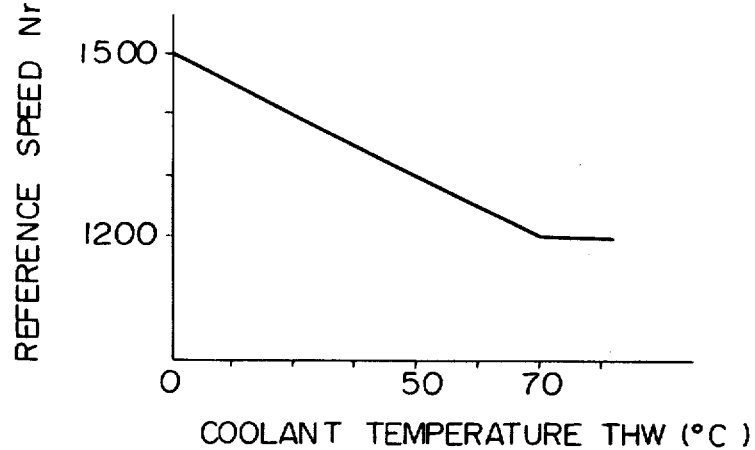
FIG. 7 is a graph illustrating the relationship between the reference speed Nr and the coolant temperature THW.

FIG. 5 illustrates the constitution of one example of the ignition control circuit 36 of FIG. 2, in which reference numeral 70 denotes an output register which receives the second output data corresponding to the ignition timing from the CPU 40 via the bus 50, and 72 denotes an output register which receives the first output data related to the timing for commencing the flow of electric current. When the load timing signal $S_{ld}$ is applied, the above data received by the output registers 70 and 72 are preset to presettable down counter 74 and 76, respectively. When the reference angular position signal $S_{bc}$ is applied slightly lagging behind the load timing signal $S_{ld}$, a flip-flop 78 is set. Thus, clock pulses CP from the clock generator circuit 48 (FIG. 2) are applied to the down counter 74 via an AND gate 80, and the down counter 74 commences the counting operation. When the second output data preset by the down counter 74 is counted down to zero, a flip-flop 82 is set by a borrow output from the down counter 74, and also by this borrow output, the flip-flop 78 is reset. The diagram (G) of FIG. 4 illustrates the content of the down counter 74 when the data is being counted while calculating the variable spark advance angle. When the flip-flop 82 is set, the down counter 76 commences to count down in response to the clock pulses CP. When the down counter 76 to which the first output data related to the timing for commencing the flow of current is preset, is counted down to zero, the flip-flop 82 is reset by the borrow output from the down counter 76. Therefore, when the variable spark advance angle is calculated, the output Q of the flip-flop 82 becomes as shown, for example, in the diagram (H) of FIG. 4, and is fed as an ignition signal to the ignition device 42. Namely, the spark is effected at the moment when the ignition signal rises, and the electric current is supplied to the ignition coil 26 at the moment when the ignition signal falls.

Below are illustrated operation of the microcomputer in FIG. 2. The following description deals with the case when the air flow sensor 10 is used instead of the pneumatic pressure sensor 12.

When the interrupt request signal $S_{irt}$ is fed from the timing signal-forming circuit 34, the CPU 40 executes the processing which is illustrated in FIG. 6. First, at a point 100, the CPU 40 discriminates whether the engine is in the starting condition or not, relying upon a signal which is applied to the input port 32 from the starter switch 15. When the engine is in the starting condition, the starting flag $F_{st}$ is set to "1" at a point 101, and the program proceeds to a point 120 which discriminates whether the engine is under the high-speed operating condition or not. When it is discriminated that the engine is not under the high-speed operating condition or, in other words, when it is discriminated that the engine is not racing, the program proceeds to a point 102 which fixes the ignition timing to a predetermined value. The content of processing for fixing the ignition timing will be mentioned later. When the engine is racing and thus it is discriminated that the engine is under a high-speed operating condition, the program proceeds to a point 114 via points 121 to 124.

Whether the engine is under a high-speed operating condition or not is discriminated by detecting predetermined parameters of operating conditions according to a variety of methods mentioned below.

(1) The rotational speed N of the engine is detected as a parameter of the operating condition and is compared with a predetermined reference value $N_{r1}$. When $N > N_{r1}$, it is discriminated that the engine is under a high-speed operating condition, and the program proceeds to a point 121. When $H \leq N_{r1}$, the program proceeds to a point 102.

(2) In performing the above-mentioned method (1), the reference value $N_r$ that is to be compared with the rotational speed N is varied responsive to the detected coolant temperature THW. According to this method, the limit of rotational speed above which limit the ignition timing is fixed is heightened when the engine is not sufficiently warmed up. Thus, the starting performance is stabilized correspondingly.

(3) The flow rate Q of the intke air is detected as a parameter of the operating condition, and is compared with a predetermined reference value $Q_{r1}$. When $Q > Q_{r1}$, it is discriminated that the engine is under a high-speed operating condition, and the program proceeds to the point 121. When $Q \leq Q_{r1}$, the program proceeds to the point 102. In this case, the reference value $Q_{r1}$ or the detected value Q may be corrected depending upon the coolant temperature THW.

(4) When a signal that indicates that the throttle valve 13 is opened greater than a predetermined angle, is introduced from the throttle sensor 11, it is discriminated that the engine is under a high-speed operating condition, and the program proceeds to the point 121. The program proceeds to the point 102 in other cases.

(5) When a signal which indicates that the rate of opening the throttle valve 13 exceeds a predetermined value, is introduced from the throttle sensor 11, it is discriminated that the engine is under a high-speed operating condition, and the program proceeds to the point 121. The program proceeds to the point 102 in other cases.

Instead of detecting the high-speed operating condition as mentioned above, it is also allowable to construct the device so that the program proceeds to the point 121 from the point 120 when the running speed of the vehicle is not zero, and the program proceeds to a point 102 when the vehicle running speed is zero.

After starting of the engine, the program proceeds from the point 100 to a point 103 where it is discriminated whether the staring flag $F_{st}$ is "1" or not. In the initial operation cycle just after starting, since the starting flag $F_{st}$ is "1", the program proceeds to points 104 and 105. At the point 104, a just after starting flag $F_{sta}$ is set to "1", and then the starting flag $F_{st}$ is reset to "0" at the point 105. At a point 106, then, the CPU 40 discriminates whether the flag $F_{sta}$ is "1" or not. Since the flag $F_{sta}$ remains at "1" in the initial operation cycle after starting, the program proceeds to a point 107 where a fixed spark advance angle flag $F_{faa}$ is set to "1". In a point 108, an initial value "20" is set to a counter C. Then, the flag $F_{sta}$ is reset to "0" at a point 109. The program then proceeds to a point 120. When the engine is not under a high-speed operating condition, the program proceeds to a point 102 to fix the ignition timing.

In the second and subsequent operation cycles after starting the engine, since the starting flag $F_{st}$ is "0", the program jumps from the point 103 to a point 106. Further, since the flag $F_{sta}$ is also "0", the program proceeds from the point 106 to a point 110 where it is discriminated whether the fixed spark advance angle flag $F_{faa}$ is "1" or not. In the second operation cycle after starting, since the flag $F_{faa}$ is "1", the program proceeds to a point 111 where the counter value C is reduced by "1". Namely, the calculation of $C \leftarrow C - 1$ is carried out. Then, at a point 112 it is discriminated whether $C = 0$ or not. When C is not "0", the program proceeds from the point 112 to the point 120. When the engine is not under the high-speed operating condition, the program proceeds to a point 102 to fix the ignition timing. When the arithmetic calculation is performed 20 times at the point 111 such that the value C becomes zero, the program proceeds from the point 112 to the point 113 where the flag $F_{faa}$ is reset to "0". The program then proceeds to the point 120. Thus, when the engine does not assume the high-speed operating condition, the ignition timing is fixed over a period of 21 times of operation cycles inclusive of the initial setting of the counter value C after starting. Thereafter, since the flag $F_{faa}$ is remained at zero, the program is branched from the point 110 to a point 114. Points 114 to 118 form a routine for processing an ordinary ignition timing calculation.

When it is attempted to race the engine during starting or during the above-mentioned 21 times of operation cycles just after starting, the program is branched into points 121, 122, 123 and 124 where the starting flag $F_{st}$ the just after starting flag $F_{sta}$ and the fixed spark advance angle flag $F_{faa}$ are reset to "0". Further, the content C of the counter is also reset to "0". The program then proceeds to a point 114. In this case, therefore, an ordinary routine for processing the ignition timing calculation is executed thereafter. In other words, if it is once discriminated that the engine is under a high-speed operating condition, the ignition timing is not fixed even when the rotational speed is decreased to a low speed, unless the engine is started again.

Figure 8:
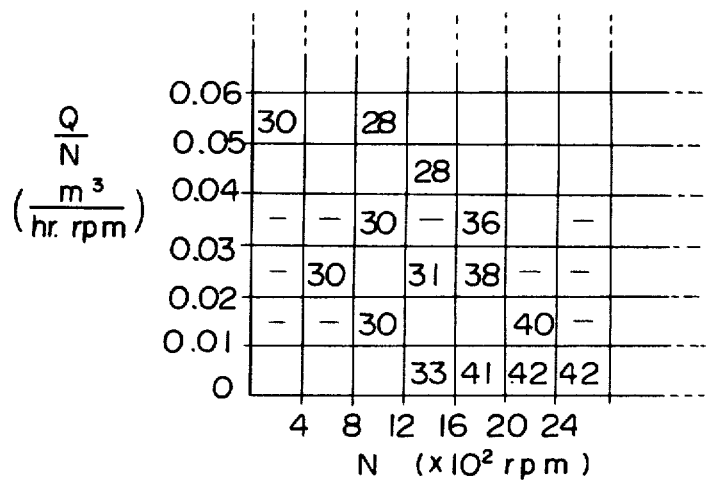
FIG. 8 is a map diagram illustrating the relationship of the spark advance angle relative to Q/N and N.

Below are illustrated the operation of the processing routine in the points 114 to 118. First, at the point 114, the CPU 40 introduces the input data related to the rotational speed N of the engine, the input data related to the flow rate Q of the intake air and the input data related to the coolant temperature THW. At the point 115, then, the CPU 40 finds an optimum spark advance angle $\theta_a$ suitable for the operating condition of that time relying upon the data of the flow rate Q of the intake air and the data of the rotational speed N. A variety of methods have been known to calculate the optimum spark advance angle. Referring, for example, to FIG. 8, a function $\theta_a = f(N, Q/N)$ which represents a desirable relationship among N, Q/N and the spark advance angle $\theta_a$, is stored beforehand in the ROM 44 in the form of a map, and the optimum spark advance angle $\theta_a$ is found by mapping. The found spark advance angle $\theta_a$ is corrected in the next point 116 responsive to a function $\alpha = g(THW)$ of the coolant temperature THW. Namely, the spark advance angle $\theta_a$ is corrected by the operation $\theta'_a \leftarrow \theta_a + \alpha$ to find a spark advance angle $\theta'_a$. At the next point 117, a crank angle $\theta_b$ between a crank angular position represented by the above found spark advance angle $\theta'_a$ and the reference angular position. According to the embodiment of the present invention, the reference angular position which is advanced by 60° from the top dead center in the compression stroke of a cylinder that is to be ignited, is employed, i.e., 60°CA·BTDC, is employed. Therefore, the crank angle $\theta_b$ can be found by $\theta_b = 60 - \theta'_a$. Then, the calculated crank angle $\theta_b$ is converted into a unit of time. The conversion is to calculate the time $T_b$ which is required by the crank shaft to turn by the angle $\theta_b$, and can be easily effected according to $$T_b = \theta_b / N$$

by utilizing the rotational speed N of that moment. Then, the found time $T_b$ is converted into a clock number of the down counter 74. The conversion is effected according to $$T_b / 12.5 \, \mu sec$$

if the period of the clock pulses is 12.5 μsec. In the next point 118, the conversion data is fed, as an ignition timing data (as a second output data), to the output register 70.

On the other hand, the CPU 40 calculates in a customary manner the time from the present ignition timing to a time at which the electric current starts to flow into the primary winding of the ignition coil to effect the spark in the next cylinder, i.e., calculates the time $T_{off}$ from the present ignition timing to a time at which the electric current commences to flow for preparing the spark in the next cylinder. The CPU 40 then converts the calculated off-current time $T_{off}$ into a clock number of the down counter 76, and produces the converted data to the output register 72 as a first output data.

Figure 9A:
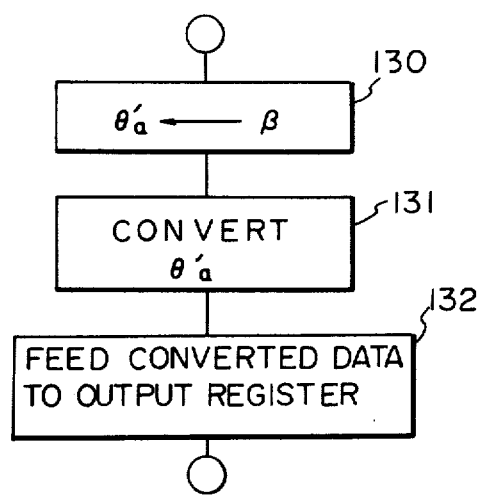
FIGS. 9a and 9b are flow diagrams illustrating part of another program for performing arithmetic operations with respect to the ignition control.

Below is illustrated the processing for controlling the ignition timing to a fixed value at the point 102. When the ignition control circuit 36 of the construction shown in FIG. 5 is used, the ignition timing is fixed by the software technique. Namely, the point 102 executes the processing which is illustrated in FIG. 9a. First, a predetermined fixed angle $\beta$ (for example $\beta = 0°CA·BTDC$) is given in a point 130 as a final spark advance angle $\theta'_a$, and points 131 and 132 execute the same processing as those of the respective points 117 and 118 of FIG. 6, so that an ignition timing data corresponding to the fixed spark advance angle $\beta$ is fed to the output register 70. Furthermore, the data related to a timing for initiating the flow of current corresponding to a predetermined off-current time $T_{off}$ (e.g., $T_{off} = 3$ msec.), is also fed to the output register 72.

Figure 9B:
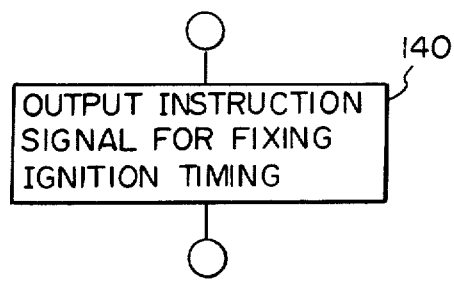
Figure 10:
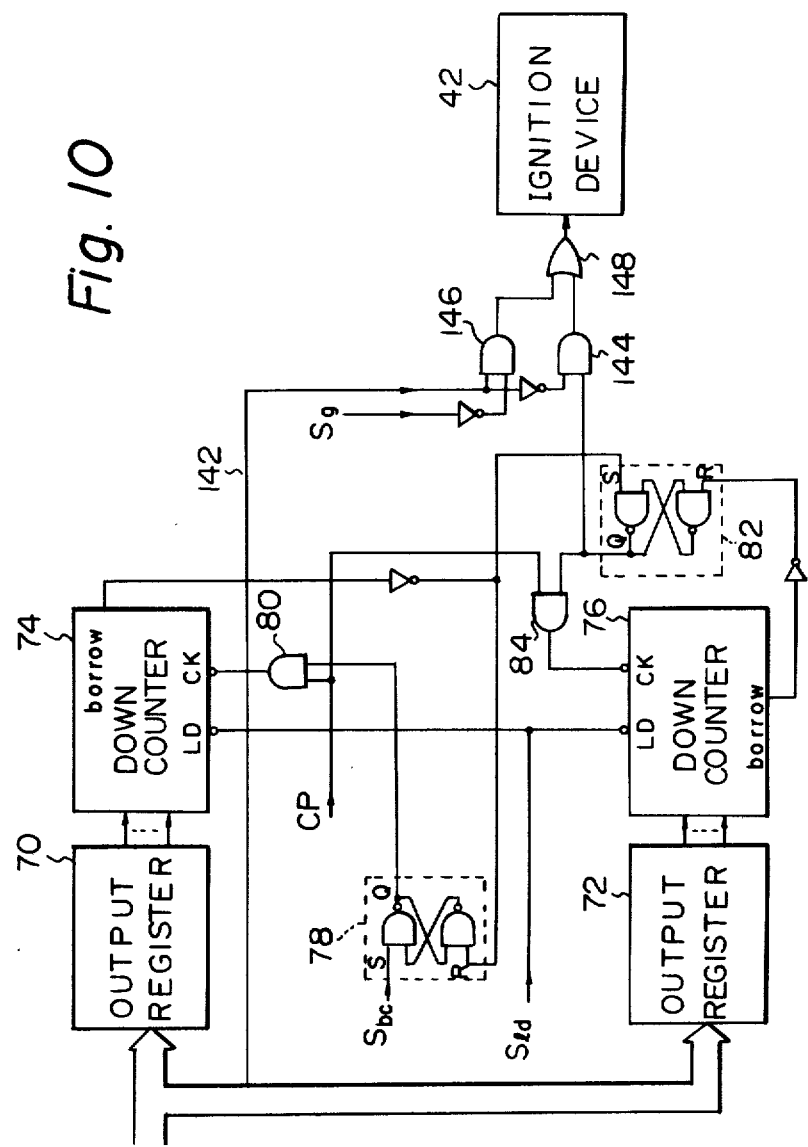
FIG. 10 is a block diagram illustrating an other example of the ignition control circuit in FIG. 2.

According to the present invention, however, the ignition timing may be controlled to a fixed value by the hardware technique using an ignition control circuit which is shown in FIG. 10. In this case, the point 102 executes the processing of a point 140 of FIG. 9b. Namely, a signal of the logic level "1" for instructing the fixed ignition timing is fed to a line 142 of FIG. 10, whereby and AND gate 114 is closed and an AND gate 146 is opened. Therefore, an inverted signal (refer to FIG. 4(I)) of the gate control signal $S_g$ from the timing signal-forming circuit 34 is applied to the ignition device 42 via an OR gate 148 in place of the ignition signal from the flip-flop 82. Therefore, the ignition timing is fixed to 0°CA·BTDC. It is further possible to control the ignition timing to a fixed value by the hardware technique when the engine is in the starting condition where the power-supply voltage is dropped, and by the software technique after starting the engine.

According to the above-mentioned embodiment, the interrupt processing routine for calculating the ignition timing is executed every time the crank shaft of the engine has turned a predetermined angle. Therefore, the processing for fixing the ignition timing is effected when the engine does not run at high speeds during starting or until the engine rotates by a predetermined number of rotations after starting. According to another embodiment of the present invention, the interrupt processing program may be executed every predetermined period of time. In this case, the processing for fixing the ignition timing will be effected when the engine does not run at high speeds during starting or until a predetermined period of time has elapsed after starting.

According to the method of the present invention as illustrated in detail in the foregoing, the control for fixing the ignition timing is interrupted when the engine is subjected to high-speed operating conditions during starting or before a predetermined period has elapsed after starting, and thus, the ignition timing is controlled by calculating depending upon the rotational speed, the flow rate of the intake air, and the pneumatic pressure in the intake manifold. Therefore, even when the engine is racing during starting or immediately after starting, it is possible to reliably prevent the occurrence of misfire, to prevent the ignition coil from overheated, and to prevent the power transistor in the igniter from being thermally destroyed. According to the present invention, furthermore, since the adverse effects of the racing do not occur, it is possible to extend the period of effecting the fixed ignition timing to stabilize the starting performance.

Although the above-mentioned embodiment has employed the rotational speed and the flow rate of the intake air as operating condition parameters for calculating the ignition timing, it is of course allowable to employ the rotational speed and the pneumatic pressure in the intake manifold as the operating condition parameters.

As many widely different embodiments of the present invention may be constructed without departing from the spirit and scope of the present invention, it should be understood that the present invention is not limited to the specific embodiments described in this specification, except as defined in the appended claims.

We claim:

1. A method of controlling the ignition timing of an internal combustion engine, comprising the steps of:
   detecting the operating condition of the engine to produce at least one first electrical signal which indicates the detected operating condition;
   calculating, in response to the produced first electrical signal, a spark advance angle which corresponds to an optimum ignition timing at the detected operating condition;
   detecting whether or not the engine is in a first specific state in which said calculation is difficult to correctly perform, to produce a second electrical signal which indicates that the engine is in the first specific state;
   producing an indication of a reference speed related to the coolant temperature of said engine, said reference speed increasing as said coolant temperature is decreasing;
   detecting whether or not the engine is in a second specific state where the rotational speed of the engine is greater than said reference speed to produce a third electrical signal which indicates that the engine is in the second specific state;
   adjusting the timing of the sparks applied to the engine depending upon said calculated spark advance angle; and
   in response to said second and third electrical signals, only when the engine is in the first specific state but not in the second specific state, keeping the timing of the sparks applied to the engine at a predetermined fixed timing.

2. A method as claimed in claim 1, wherein said first specific state detecting step includes a step of detecting whether the engine is in the starting condition or not, to produce the second electrical signal when the engine is in the starting condition.

3. A method as claimed in claim 2, wherein said first specific state detecting step includes a step of detecting whether a predetermined period has passed after starting or not, to produce the second electrical signal when a predetermined period has not elapsed after starting.

4. Apparatus for controlling the ignition timing of an internal combustion engine comprising:
   means for detecting the operating condition of the engine to produce at least one first electrical signal which indicates the detected operating condition;
   processing means for determining in response to the produced first electrical signal, a spark advance angle which corresponds to an optimum ignition timing at the detected operating condition;
   first means for detecting whether or not the engine is in a first specific state in which said determination is difficult to correctly perform, to produce a second electrical signal which indicates that the engine is in the first specific state;
   means for producing an indication of a reference speed related to the coolant temperature of said engine, said reference speed increasing as said coolant temperature is decreasing;
   second means for detecting whether or not the engine is in a second specific state where the rotational speed of the engine is greater than said reference speed to produce a third electrical signal which indicates that the engine is in the second specific state; and
   means for adjusting the timing of the sparks applied to the engine depending upon aid calculated spark advance angle;
   said processing means being responsive to said second and third electrical signals for keeping the timing of the sparks applied to the engine at a predetermined fixed timing only when the engine is in the first specific state but not in the second specific state.

5. Apparatus as in claim 4, wherein said first detecting means includes means for detecting whether the engine is in the starting condition or not, to produce said second electrical signal when said engine is in said starting condition.

6. Apparatus as in claim 5, wherein said first detecting means includes means for detecting whether a predetermined period has passed after starting or not, to produce said second electrical signal when a predetermined period has not elapsed after starting.

7. A method of controlling the ignition timing of an internal combustion engine, comprising the steps of:
   producing at least one first electrical signal which indicates the operating condition of the engine;
   producing a second electrical signal which indicates that a predetermined period of time has elapsed after starting;
   calculating, in response to said first electrical signal, a spark advance angle which corresponds to an optimum ignition timing at the operation condition indicated by said first electrical signal;
   adjusting the timing of the sparks applied to the engine depending upon said calculated spark advance angle when said second electrical signal is produced;
   keeping the timing of the sparks applied to the engine at a predetermined fixed timing when said second electrical signal is not produced;
   producing a third electrical signal which indicates the rotational speed of the engine;
   producing a fourth electrical signal which indicates the warm-up condition of the engine;
   producing, in response to said fourth electrical signal, a fifth electrical signal which indicates a reference engine speed dependent upon the warm-up condition of the engine;
   comparing said third electrical signal with said fifth electrical signal to produce a sixth electrical signal which indicates that the engine rotational speed is higher than said reference engine speed; and
   stopping the operation of keeping the spark timing at a predetermined fixed timing when said sixth electrical signal is produced and adjusting the spark timing depending upon said calculated spark advance angle.

8. A method as claimed in claim 7, wherein said fourth electrical signal producing step includes a step of detecting the coolant temperature of the engine to produce a fourth electrical signal.

9. A method as claimed in claim 8, wherein said fifth electrical signal producing step includes a step of determining a reference engine speed depending upon the coolant temperature to increase said reference engine speed when the coolant temperature decreases.

10. An apparatus for controlling the ignition timing of an internal combustion engine, comprising:

means for producing at least one first electrical signal which indicates the operating condition of the engine;

means for producing a second electrical signal which indicates that a predetermined period of time has elapsed after starting;

means for calculating, in response to said first electrical signal, a spark advance angle which corresponds to an optimum ignition timing at the operation condition indicated by said first electrical signal;

means for adjusting the timing of the sparks applied to the engine depending upon said calculated spark advance angle when said second electrical signal is produced;

said calculating keeping the timing of the sparks applied to the engine at a predetermined fixed timing when said second electrical signal is not produced;

means for producing a third electrical signal which indicates the rotational speed of the engine;

means for producing a fourth electrical signal which indicates the warm-up condition of the engine;

means for producing, in response to said fourth electrical signal, a fifth electrical signal which indicates a reference engine speed dependent upon the warm-up condition of the engine;

means for comparing said third electrical signal with said fifth electrical signal to produce a sixth electrical signal which indicates that the engine rotational speed is higher than said reference engine speed; and said calculating means stopping the operation of keeping the spark timing at a predetermined fixed timing when said sixth electrical signal is produced and calculating said optimum ignition timing in accordance with said first electrical signal.

11. An apparatus as claimed in claim 10, wherein said fourth electrical signal producing means includes means for detecting the coolant temperature of the engine to produce a fourth electrical signal.

12. An apparatus as claimed in claim 11, wherein said fifth electrical signal producing means includes means for determining a reference engine speed depending upon the coolant temperature to increase said reference engine speed when the coolant temperature decreases.

* * * * *